United States Patent
Ueno et al.

(10) Patent No.: US 6,536,476 B2
(45) Date of Patent: Mar. 25, 2003

(54) FLOW RATE-CONTROLLING METHOD AND MICROVALVE THEREFOR

(75) Inventors: Naohiro Ueno, Miyaki-gun (JP); Morito Akiyama, Tosu (JP); Hiroyuki Nakamura, Tosu (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/046,406

(22) Filed: Jan. 16, 2002

(65) Prior Publication Data

US 2002/0096222 A1 Jul. 25, 2002

(30) Foreign Application Priority Data

Jan. 22, 2001 (JP) ........................................ 2001-013056

(51) Int. Cl.[7] ................................................. F15C 1/04
(52) U.S. Cl. ........................................ 137/828; 137/833
(58) Field of Search ................................... 137/828, 833

(56) References Cited

U.S. PATENT DOCUMENTS

| 4,989,626 A | * | 2/1991 | Takagi et al. ................. 137/13 |
| 5,101,848 A | * | 4/1992 | Kojima et al. ................ 137/13 |
| 5,988,197 A | * | 11/1999 | Colin et al. ................... 137/13 |

* cited by examiner

Primary Examiner—A. Michael Chambers
(74) Attorney, Agent, or Firm—Wenderoth, Lind & Ponack, L.L.P.

(57) ABSTRACT

The invention discloses a method for fine control of the flow rate of a liquid by a microvalve device without using any mechanical structures. The method comprises, while passing the liquid through a flow channel penetrating a substrate of a heat-insulating material, the temperature of the liquid in the flow channel is decreased below the freezing point of the liquid by a temperature-controlling means such as a Peltier element facing the flow channel to close the flow channel by the solidified liquid and the temperature of the solidified liquid is increased above the melting point thereof to cause thawing of the solid resulting in re-opening of the flow channel.

3 Claims, 1 Drawing Sheet

FLOW RATE-CONTROLLING METHOD AND MICROVALVE THEREFOR

BACKGROUND OF THE INVENTION

The present invention relates to a controlling method for an extremely fine flow rate of a liquid and a microvalve device for practicing the flow rate-controlling method without utilizing any mechanical means for closing and opening a microsize flow channel.

Along with the progress in the microtechnology in recent years, it is sometimes required to finely control an extremely small flow rate of a liquid within a microtechnological system. The conventional means for such fine flow rate control is to use a mechanical device which is a mere miniaturization of an ordinary size mechanical valve for opening and closing the flow channel including those utilizing a membrane valve. Since mechanical movements of the component parts are indispensable in these conventional fine flow rate-controlling means or devices, it is sometimes unavoidable that the accuracy of flow rate control is subject to gradual degradation in the long run due to abrasive wearing or corrosion of the parts constituting the valve device eventually leading to a serious trouble of leakage of the liquid as the wearing or corrosion of the parts has proceeded so far.

In addition, the flow rate controlling system in the prior art is intrinsically complicated because an actuator is always employed for operating the movable parts of the valve device for opening and closing the flow channel. Moreover, the accuracy or precision of flow rate control to accomplish a flow rate as desired can be ensured only by the use of a special controlling mechanism for opening and closing the mechanical valve device. Accordingly, the system as a whole unavoidably has a very complicated structure in order to accomplish continuous fine control of the flow rate of a liquid.

On the other hand, a proposal is made in recent years for a microswitching valve chip by utilizing a shape-memory alloy which serves to dynamically switch a multiplicity of flow channels existing within a chemical IC so as to accomplish dynamical conversion of the reaction system. This method, however, cannot be suitable for practical applications unless several problems have been solved in addition to the disadvantages due to the use of a shape-memory alloy which is a very special and expensive material and a valve member of a specific form from a photocurable resin.

SUMMARY OF THE INVENTION

The present invention accordingly has an object, in view of the above described problems and disadvantages in the conventional flow rate-controlling methods in a microscopically fine flow channel, to provide a novel flow rate-controlling method in fine flow channels without using any mechanical members or any special materials but by utilizing the property changes of the liquid per se flowing through the flow channels.

Thus, the present invention provides a novel method for finely controlling the flow rate of a liquid, which is subject to solid/liquid phase transition by decreasing or increasing the temperature, which comprises the steps of:

(a) passing the liquid through a microchannel for flowing of the liquid formed in a substrate made of a heat-insulating material; and (b1) decreasing the temperature of the liquid below the solid/liquid phase transition temperature of the liquid so as to effect closing of the microchannel for liquid flow with the solid formed from the liquid; or (b2) increasing the temperature of the solidified liquid above the solid/liquid phase transition temperature of the liquid to effect thawing of the solid in the microchannel for liquid flow so as to re-open the microchannel.

The present invention also provides a microvalve device for fine control of the flow rate of a liquid, which is subject to reversible solid/liquid phase transition by decreasing or increasing the temperature of the liquid, which comprises: a substrate plate made of a heat-insulating material and provided with at least one flow channel penetrating the substrate plate and filled with the liquid; and a temperature-controlling means at or in the vicinity of the flow channel capable of decreasing or increasing the temperature of the liquid filling the flow channel below or above the solid/liquid phase transition temperature of the liquid.

DETAILED DESCRIPTION OF THE PREFERRED EMBODIMENTS

In the following, the method of the present invention for fine flow rate control of a liquid and the microvalve device for practicing the inventive method are described in more detail by making reference to the accompanying drawing although the following description never limits the scope of the invention in any way.

Figure 1:
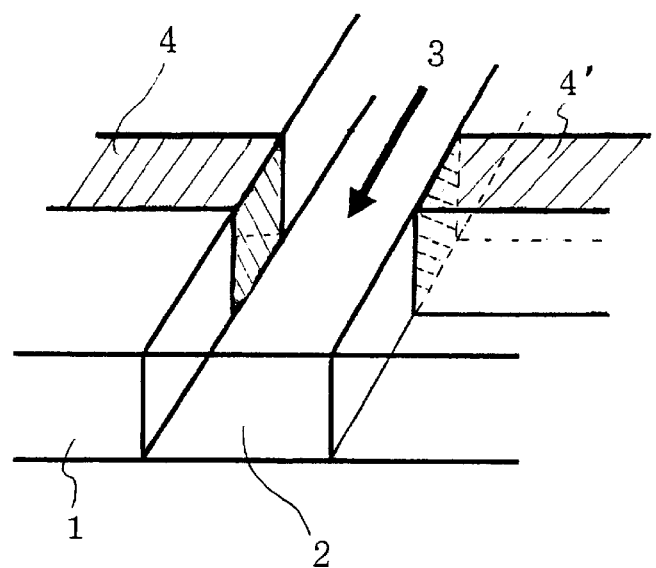
FIG. 1 is a schematic perspective illustration of the inventive microvalve deice comprising a substrate plate 1, a flow channel 2 for the flow of a liquid 3 and temperature-controlling means 4,4'.

FIG. 1, which serves to describe the basic concept of the inventive method, is a schematic perspective illustration of the inventive microvalve device which comprises: a substrate plate 1 made of a heat-insulating material and provided with at least one flow channel 2 to penetrate the substrate plate 1, through which the liquid 3 as the objective fluid of the inventive method flows in the direction indicated by the arrow. A pair of temperature-controlling means 4,4' are provided to face the flow channel 2 on both side walls and the temperature of the liquid 3 flowing through the flow channel 2 can be reversibly decreased or increased thereby below or above the phase transition temperature of the liquid 3.

When the liquid 3 is kept at a temperature higher than the phase transition temperature thereof, the liquid 3 can freely flow through the flow channel 2 under application of an appropriate pressure difference. Then, the temperature-controlling means 4,4' are driven into operation to decrease the temperature of the liquid 3 in the flow channel 2 so as to decrease the temperature of the liquid 3 below the phase transition temperature thereof, the liquid 3 is naturally solidified and converted into solid to plug the flow channel 2 so that the flow channel 2 is closed to inhibit flow of the liquid 3 therethrough. By operating the temperature-controlling means 4,4' to increase the temperature of the solidified liquid 3 clogging the flow channel 2 to a temperature higher than the phase transition temperature of the liquid 3, the solid naturally thaws to re-open the flow channel 2 so as to regain free flowing of the liquid 3 through the flow channel 2.

The heat-insulating material to form the substrate plate 1 can be selected from a variety of materials including ceramic materials and plastic resins as well as certain metallic materials if provided with an appropriate heat-insulating means. The flow channel 2, of which the cross section can be circular or rectangular without limitation, to penetrate the substrate plate 1 can be formed by engraving the surface of a plate for the substrate 1 to form a line groove or by drilling a substrate plate from one surface to the opposite surface. The cross sectional dimension of the flow channel 2 is not particularly limitative depending on the properties of the liquid 3 under flow rate control according to the inventive method and microvalve device. Assuming that the flow channel 2 has a circular cross section, the diameter of the flow channel 2 is, as a measure, selected in the range from 0.1 to 1 mm.

A great variety of liquid materials can be an objective fluid to which the method and microvalve device of the invention are applicable provided that the liquid is subject to reversible solid/liquid phase transition by decreasing or increasing the temperature. Examples of such a liquid material include certain heat-sensitive resins such as poly (diisopropylacrylamides), higher hydrocarbon oils such as paraffins and alloys of low melting point. The present invention is particularly satisfactory for the flow rate control of a heat-sensitive working fluid.

Though not particularly limitative, either one or both of the temperature-controlling means 4,4' are formed from a Peltier element because a Peltier element serves dually to decrease and to increase the temperature by simply reversing the polarity of the direct current therethrough. Although it is the most desirable disposition of the temperature-controlling means 4,4' that the means directly face the flow channel 2 to form a coplanar wall surface as is illustrated in FIG. 1, an alternatively possible disposition of the means 4,4', when they have dimensions not suitable for positioning at or in the vicinity of the flow channel 2 for obtaining a large heat capacity that a heat-conductive channel is provided with a material of high thermal conductivity between the temperature-controlling means and the walls of the flow channel 2.

In the microvalve device of the present invention, the cross section of the flow channel 2 is so small to ensure a small heat capacity of the liquid 3 contained in the flow channel 2 which means a rapid cooling and heating of the liquid 3 so that the response time of the microvalve device can be short enough provided that the temperature-controlling means have an appropriately large heat capacity to ensure closing and re-opening of the flow channel 2 with a minimum time lag.

The applicability of the inventive flow rate-controlling method is not limited to liquids and extends to the flow rate control of a gas, which cannot be chilled below the transition point. For example, the flow rate of a gas can be controlled by providing a side channel for a valve-operating liquid in the portion surrounded by the temperature-controlling means 4,4' to serve for closing and re-opening the flow channel.

Figure 2:
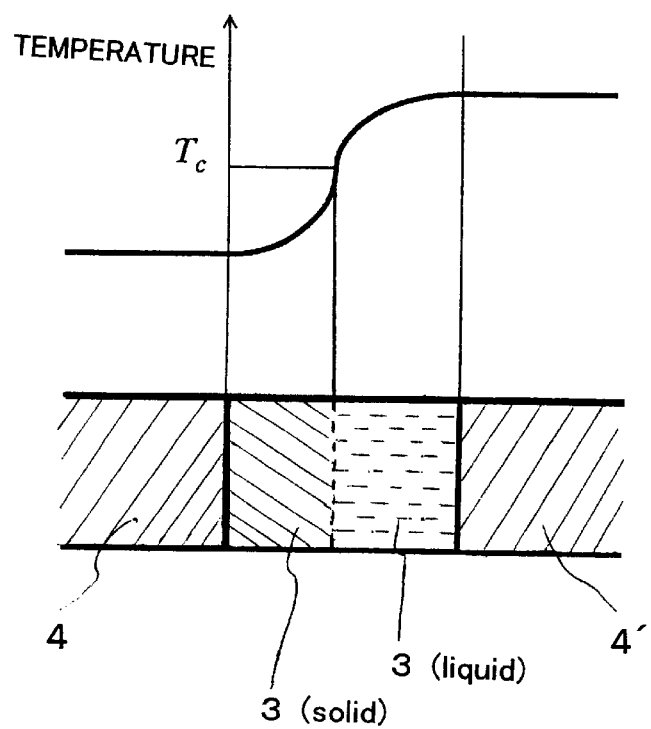
FIG. 2 is a schematic illustration to explain the principle of continuous flow rate control by partial closure of the flow channel 2. The S-shaped curve shows the temperature distribution of the liquid between the temperature-controlling means 4,4' across the flow channel 2, Tc being the solid/liquid phase transition temperature of the liquid.

According to the present invention, the flow rate of a liquid can be controlled with a continuous change in the flow rate. FIG. 2 is an illustration of the principle of this continuous controlling method. Thus, one of the temperature-controlling means 4,4' provided on both sides of the flow channel 2, i.e. the means 4 at the left side of the flow channel 2 on the figure, is kept below the liquid/solid phase transition temperature of the liquid and the other of the temperature-controlling means 4' at the right side of the flow channel 2 is kept at a temperature exceeding the phase transition temperature of the liquid so that the liquid flow through the flow channel 2 has a temperature distribution indicated by the S-shaped curve across the flow channel 2 involving the solid/liquid phase transition temperature Tc, i.e. freezing point, of the liquid forming a solid/liquid interface along the middle way between the two side walls of the flow channel 2 thus to partially close the flow channel 2. Accordingly, the flow rate of the liquid through the flow channel 2 can be varied continuously by adequately selecting the temperature relationship between the two temperature-controlling means 4,4' to continuously modifying the proportion of partial closure of the flow channel 2.

What is claimed is:

1. A microvalve device for controlling the flow rate of a liquid, which is subject to reversible solid/liquid phase transition by decreasing and increasing the temperature, which comprises:

(A) a substrate made of a heat-insulating material and having at least one flow channel penetrating the substrate, through which the liquid flows; and (B) two Peltier element temperature-controlling means oppositely disposed on both sides of the flow channel and each capable of being kept at a temperature below or above the solid/liquid phase transition temperature of the liquid independently from the other and being capable of decreasing and increasing the temperature of the liquid in the flow channel below or above the solid/liquid phase transition temperature of the liquid.

2. The microvalve device as claimed in claim 1 in which the heat-insulating material of the substrate is selected from the group consisting of ceramics and plastic resins.

3. The microvalve device as claimed in claim 1 in which the flow channel has a cross sectional area equivalent to the area of a circle of 0.1 to 1 mm diameter.

* * * * *